(12) United States Patent
Yamasaki

(10) Patent No.: US 9,118,800 B2
(45) Date of Patent: Aug. 25, 2015

(54) IMAGE READING APPARATUS

(71) Applicant: Yasuo Yamasaki, Nagoya (JP)

(72) Inventor: Yasuo Yamasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,542

(22) Filed: Sep. 27, 2013

(65) Prior Publication Data

US 2014/0185111 A1    Jul. 3, 2014

(30) Foreign Application Priority Data

Dec. 28, 2012   (JP) ................................ 2012-287360

(51) Int. Cl.
    *H04N 1/04*       (2006.01)
    *H04N 1/10*       (2006.01)
    *H04N 1/193*      (2006.01)

(52) U.S. Cl.
    CPC ............. *H04N 1/103* (2013.01); *H04N 1/1017* (2013.01); *H04N 1/1026* (2013.01); *H04N 1/193* (2013.01); *H04N 2201/0442* (2013.01)

(58) Field of Classification Search
    CPC ... H04N 1/103; H04N 1/1017; H04N 1/1026; H04N 1/193
    USPC .................................. 358/497, 408, 474, 496
    See application file for complete search history.

(56) References Cited

U.S. PATENT DOCUMENTS 7,643,184 B2 *   1/2010   Duan ............................ 358/497

FOREIGN PATENT DOCUMENTS

| CN | 101668104 | * 10/2010 | ............... H04N 1/04 |
| JP | 10-004485 A | 1/1998 | |
| JP | 11-266347 A | 9/1999 | |
| JP | 3579570 B2 | 10/2004 | |

* cited by examiner

*Primary Examiner* — Houshang Safaipour
(74) *Attorney, Agent, or Firm* — Banner & Witcoff, Ltd.

(57) ABSTRACT

An image reading apparatus includes: a document table that includes one surface on which a document is to be placed; an image reader that is provided over the other surface of the document table and is configured to read an image of the document being placed on the document table; and a resin housing that houses the document table and the image reader therein. The image reader includes: an image sensor including a plurality of reading elements arranged in a first direction; a holder configured to support the image sensor; a resin guide integrally formed with the housing; a reinforcement member which is made by a metal plate and provided at the guide; and a driver configured to move the holder along the guide in a second direction substantially perpendicular to the first direction.

8 Claims, 7 Drawing Sheets

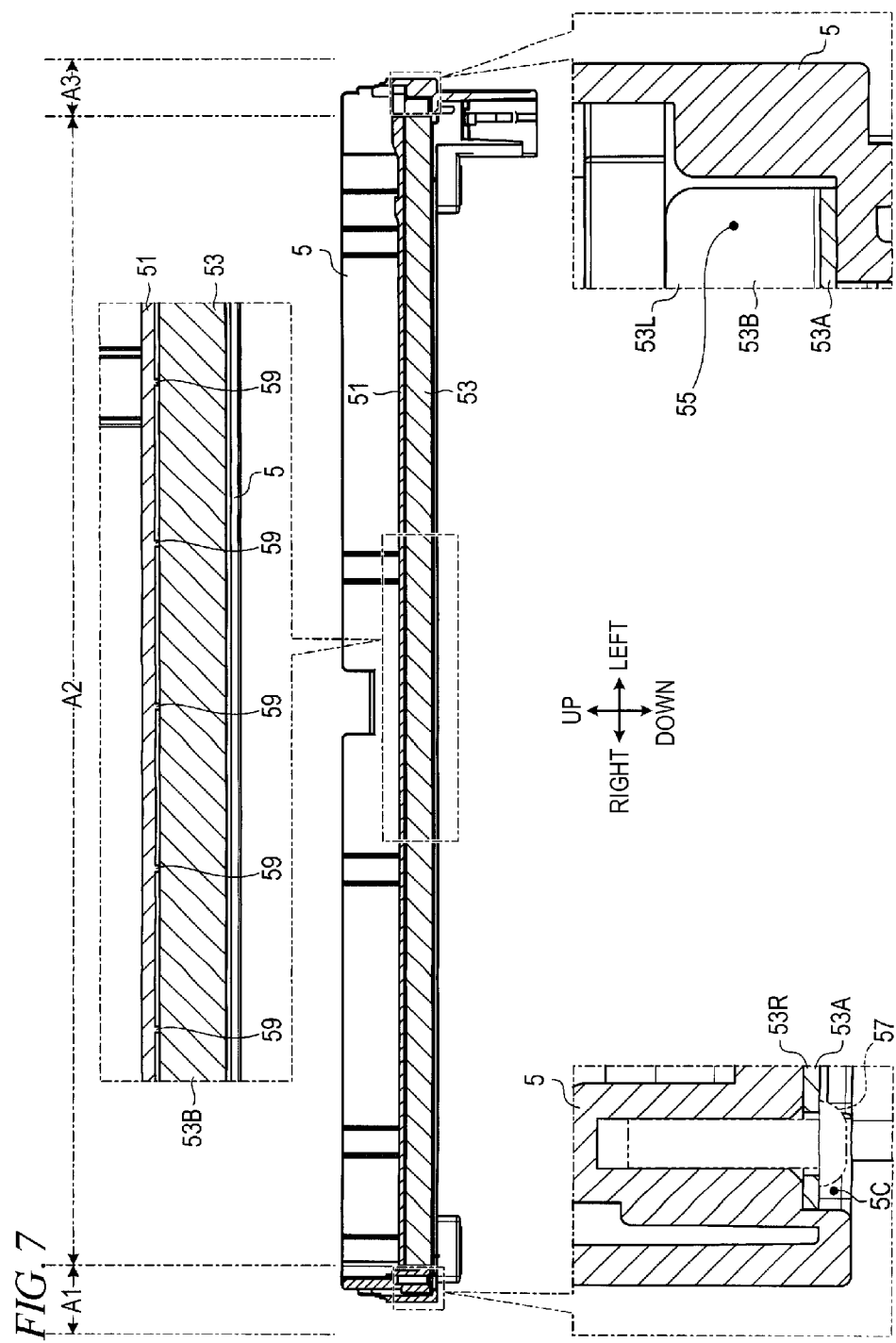

IMAGE READING APPARATUS

CROSS-REFERENCE TO RELATED APPLICATION

This application is based upon and claims the benefit of priority of Japanese Patent Application No. 2012-287360 filed on Dec. 28, 2012, the contents of which are incorporated herein by reference in its entirety.

BACKGROUND

The present disclosure relates to an image reading apparatus.

The image reading apparatus called flatbed type is known conventionally. The image reading apparatus of this type is generally provided with an image sensor that has reading elements arranged in a main scanning direction and a holder, such as a carriage, that moves the image sensor in a sub-scanning direction substantially perpendicular to the main scanning direction. The holder is structured to move along a guide (e.g. a guide shaft). The guide uses a metal shaft in a round-bar shape.

SUMMARY

However, in case a round-bar metal shaft is employed as a guide as in the exiting image reading apparatus, much time and effort is required in fabricating a guide. It is also problematic that manufacture cost rises with an increase of the time and effort spent in fabrication. Thus, there is a desire to make up a guide by using a substitute that is more producible than the round-bar metal shaft.

An aspect of the present disclosure has been made to solve the problem and aims at providing an image reading apparatus equipped with a guide that is easier to fabricate than the existing one.

The configuration adopted in the aspect of the present disclosure is described below.

An image reading apparatus comprising:
a document table that includes one surface on which a document is to be placed;
an image reader that is provided over the other surface of the document table and is configured to read an image of the document being placed on the document table; and
a resin housing that houses the document table and the image reader therein;
wherein the image reader includes:
an image sensor including a plurality of reading elements arranged in a first direction;
a holder configured to support the image sensor;
a resin guide integrally formed with the housing;
a reinforcement member which is made by a metal plate and provided at the guide; and
a driver configured to move the holder along the guide in a second direction substantially perpendicular to the first direction.

BRIEF DESCRIPTION OF THE DRAWINGS

FIG. 7 is a longitudinal sectional view taken along a plane indicated by a line A-A in FIG. 6.

DESCRIPTION OF EXEMPLARY EMBODIMENT

An exemplary embodiment according to the present disclosure will now be described by taking one example. In the present embodiment, an image reading apparatus exemplified is configured as a multifunction device having a function (of scanning) of an image reading apparatus and, in addition, other functions (e.g. printing, copying, facsimile transmission/reception, etc.). In the following, various parts of a multifunction device are explained by use of directional indications of up, down, left, right, front and rear given in each figure in order to briefly explain the relative positional relationship of the parts.

Construction of the Multifunction Device

Figure 1:
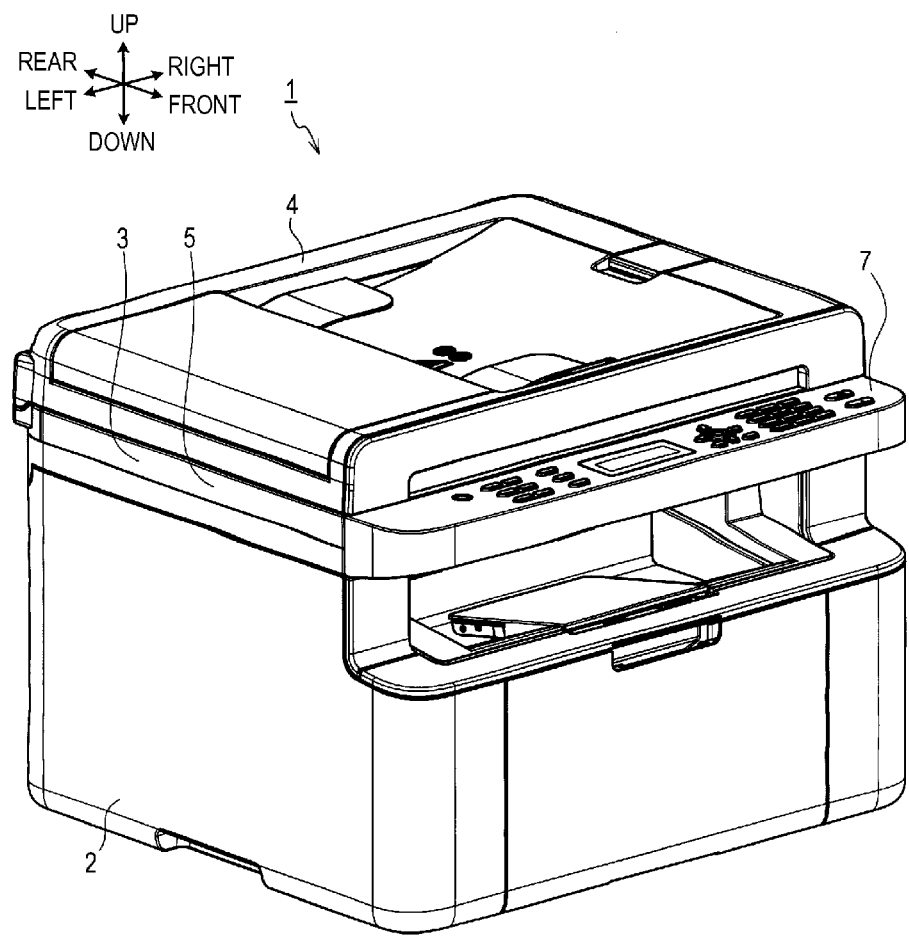
FIG. 1 is a perspective view showing an exterior appearance of a multifunction device.

A multifunction device 1 includes a main body unit 2, a scanner unit 3 mounted on the main body unit 2 and an ADF unit 4 mounted on the scanner unit 3, as shown in FIG. 1.

The scanner unit 3 has a housing 5 formed of resin. A platen glass 6 is attached in a position giving an upper surface of the housing 5. The scanner unit 3 has a housing provided to open and close relatively to a housing of the main body unit 2.

The ADF unit 4 is provided to be opened and closed relatively to the scanner unit 3. The ADF unit 4, when closed (see FIG. 1), serves as a cover that covers an upper surface of the platen glass 6. In case the ADF unit is open, the platen glass 6 is exposed at its upper surface to outside.

The main body unit 2 has a control panel 7, for a user to operate, in a front upper part thereof, as shown in FIG. 1. Besides the control panel 7, the main body unit 2 has a control section 11, an image forming section 12, a LAN communication section 13, a PSTN communication section 14 and so on.

The control section 11 includes a CPU 11A, a ROM 11B, a RAM 11C, an NVRAM 11D and an interface section 11E. The CPU 11A executes a predetermined process according to a control program stored in the ROM 11B or RAM 11C and thereby effects control over various sections of the multifunction device 1.

The image forming section 12 has an electrophotographic or inkjet print mechanism. The LAN communication section 13 is configured with a communication interface device compatible with wireless LANs and a communication interface device compatible with wired LANs. The PSTN communication section 14 is configured with various devices, including FAX modems and voice codecs, required in connection to public switched telephone networks (PSTNs).

The control panel 7 has an input device (e.g. a touch panel, buttons and switches) which a user operates when giving various instructions to the multifunction device 1 and an output device (e.g. a liquid-crystal display) which informs a user of operation states, etc. of the multifunction device 1.

The scanner unit 3 includes an line image sensor 21 having a plurality of reading elements and a holder 23 supporting the image sensor 21. The scanner unit 3 also includes a motor 25, a gear mechanism 27 to be operated by the motor 25 and a timing belt 29 to be driven by the gear mechanism 27, wherein the holder 23 is coupled to the timing belt 29. The motor 25 operates on a drive signal received from a driver section 11F for motors provided in the interface section 11E of the control section 11. The power the motor 25 generated is delivered to the holder 23 through the gear mechanism 27 and timing belt 29. As a result, the holder 23 moves in a left-right direction together with the image sensor 21.

Figure 2:
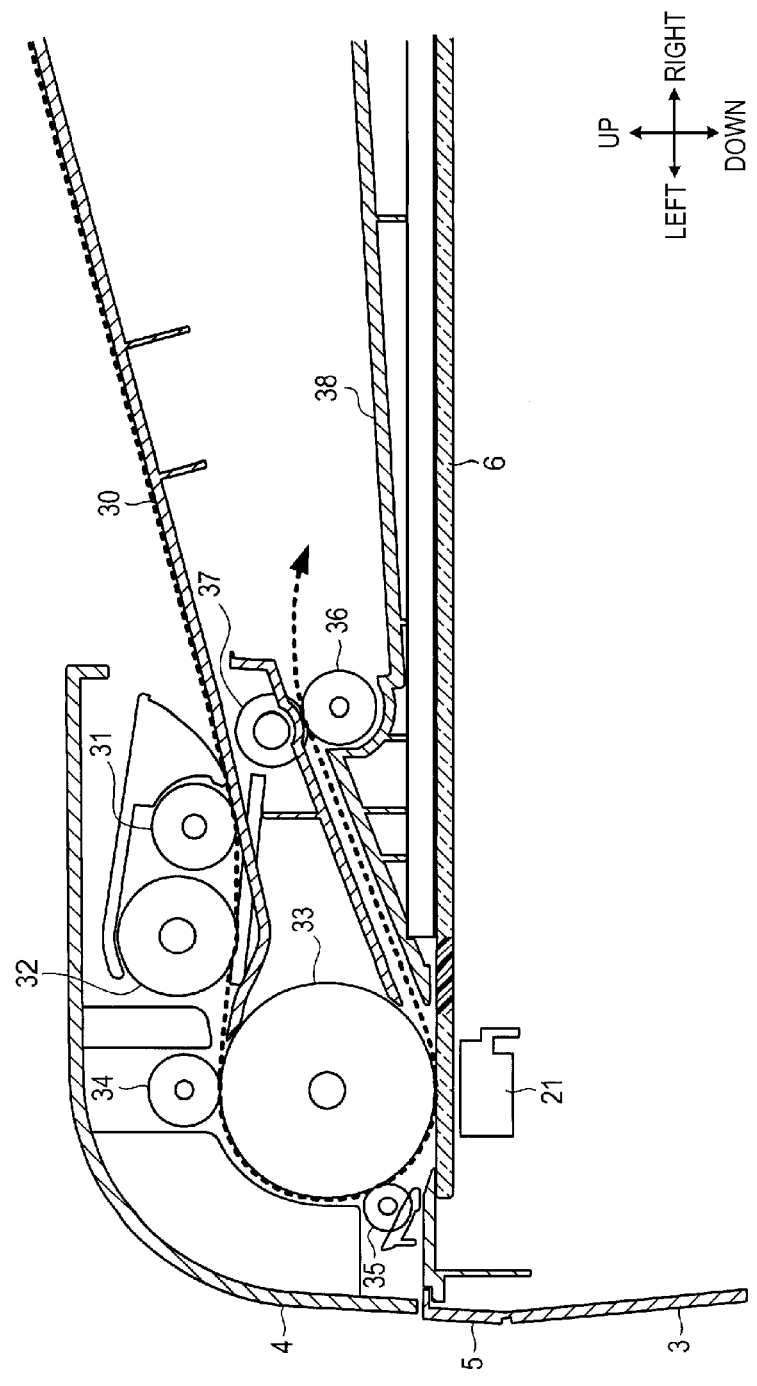
FIG. 2 is a longitudinal sectional view showing an internal arrangement of a scanner unit and ADF unit.
Figure 3:
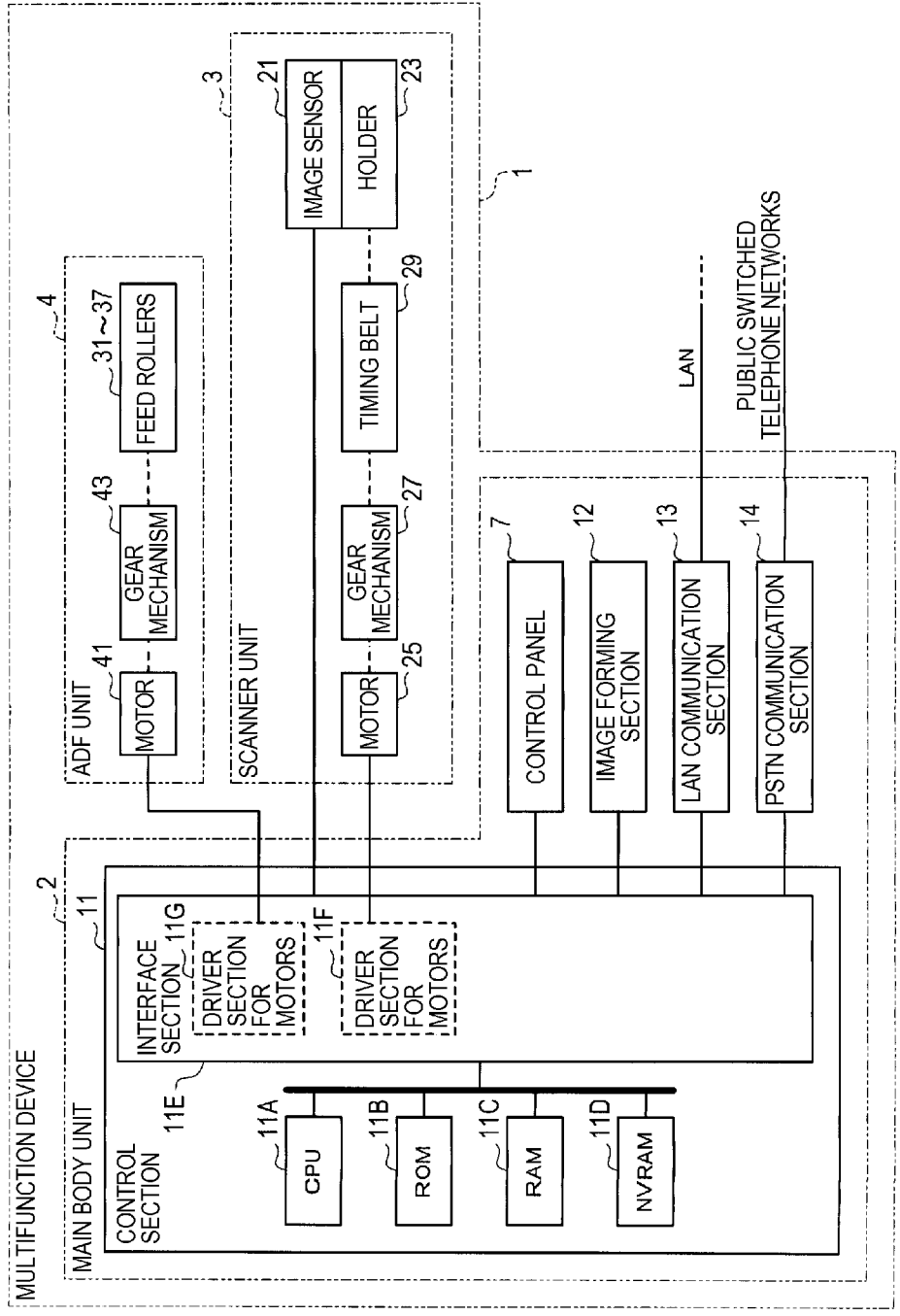
FIG. 3 is a block diagram showing an internal configuration of the multifunction device.

The ADF unit 4 is provided with feed rollers 31-37 in order to feed the documents, placed on a document feeder 30, along a predetermined path (or path indicated by the broken line in FIG. 2). The document, moved by the feed rollers 31-37, is discharged to a document discharged portion 38. The ADF unit 4 is provided with a motor 41, a gear mechanism 43 that is actuated by the motor 41 and so on, as shown in FIG. 3. The motor 41 operates on a drive signal received from the driver section 11G for motors provided in the interface section 11E of the control section 11. Some of the feed rollers 31-37 are provided as drive rollers that are directly driven by the gear mechanism 43 while some of the rest are as follower rollers to rotate following the drive rollers or a document. The power the motor 41 generated is delivered to the drive rollers through the gear mechanism 43.

When an image of the document is read by the line image sensor 21 using the ADF unit 4, the line image sensor 21 is positioned to be opposed to the feed roller 33 with interposing the platen glass 6 therebetween, and the document is fed from the document feeder to the document discharged portion 38 by the feed rollers 31-37 while a part of the document contacts a part of the upper surface of the platen glass 6 between the feed roller 33 and the image sensor 21. The image sensor 21 reads the image of the document while the document is fed.

Details of the Scanner Unit

Figure 4:
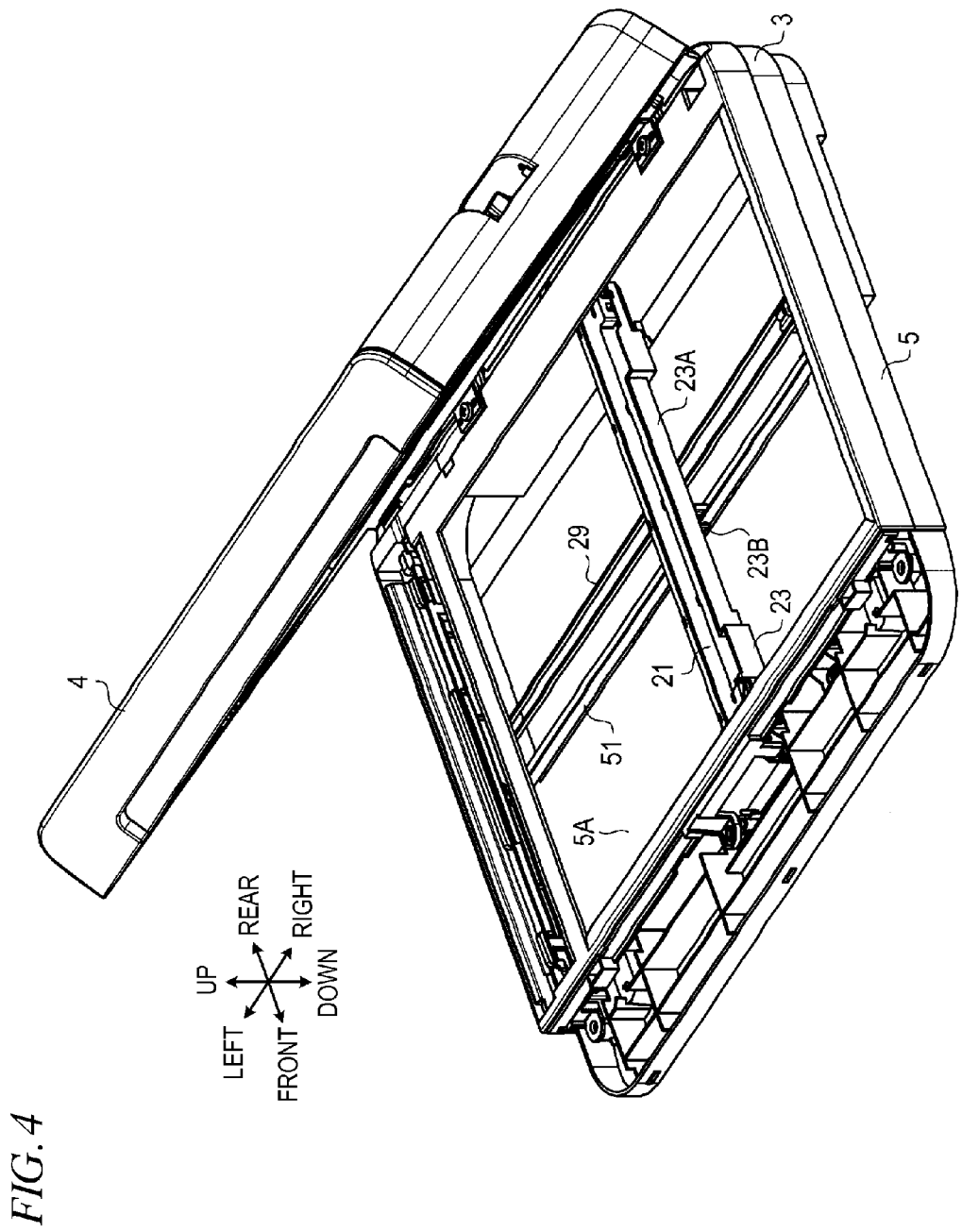
FIG. 4 is a perspective view showing an exterior appearance of the scanner unit and ADF unit.

The scanner unit 3 is arranged therein with the image sensor 21, the holder 23, the timing belt 29 and the like, as shown in FIG. 4. The image sensor 21 is given a contact image sensor (CIS). The image sensor 21 has a plurality of reading elements arranged in a front-rear direction of the multifunction device 1. Hereinafter, the front-rear direction in which the reading elements are arranged is also referred to as a main scanning direction.

The holder 23 has a carriage 23A and a slider 23B attached at a bottom of the carriage 23. The slider 23B is provided around a center, in the main scanning direction, of the carriage 23A and formed of a material higher in slidableness than the carriage 23A. Specifically, the carriage 23A is formed of an ABS resin while the slider 23B is of a polyacetal resin (POM).

A guide 51 is provided extending in the left-right direction on a bottom inner surface of the housing 5 of the scanner unit 3. The guide 51 is integrally formed of a resin material with the housing 5. When the timing belt 29 is driven, the holder 23 moves in the left-right direction along the guide 51. On this occasion, the slider 23B slides over the guide 51. Hereinafter, the left-right direction in which the image sensor 21 and holder moves is referred also to as a sub-scanning direction.

Figure 5:
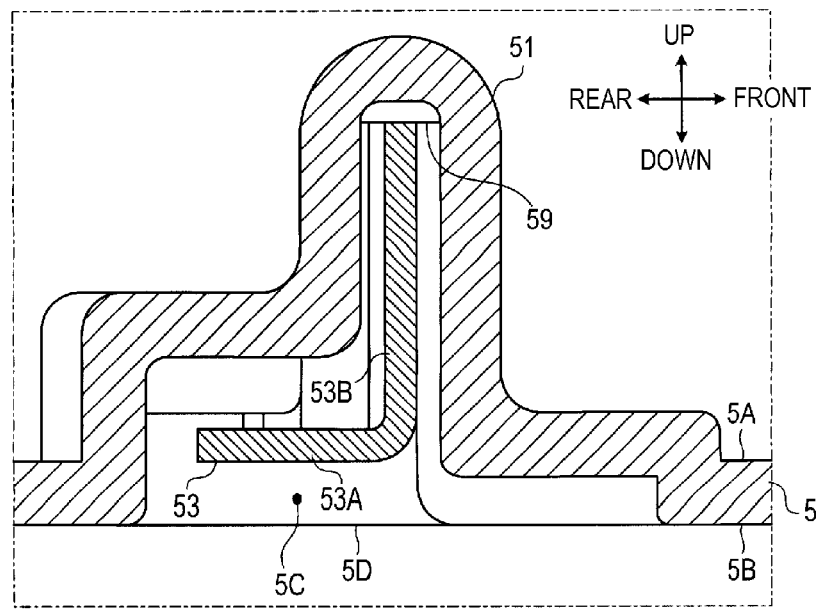
FIG. 5 is a longitudinal sectional view showing a guide and reinforcement member.

The housing 5 is formed with a recess 5C recessing upward, in a bottom outer surface 5B as shown in FIG. 5. The recess 5C forms the guide 51 with its inner space. A reinforcement member 53 is received in the inner space (recess 5C) of the guide 51.

The reinforcement member 53 is a metal-plate component formed by pressing in a generally L-form in a cross-section perpendicular to a lengthwise of the member, wherein the member has a base portion 53A given as a plate-shaped portion extending parallel with the bottom of the housing 5 and a ridge portion 53B given as a plate-shaped portion vertical to the bottom of the housing 5.

The reinforcement member 53 is attached, with the lengthwise thereof directed in the left-right direction, on the housing 5 at its bottom surface (or lower surface). The base portion 53A of the reinforcement member 53, lowest in position, is received upper than a plane 5D of the opening defined by a lower end of the recess 5C, as shown in FIG. 5C. This ensures the reinforcement member 53 not to protrude downward from the bottom outer surface 5B of the housing 5.

Figure 6:
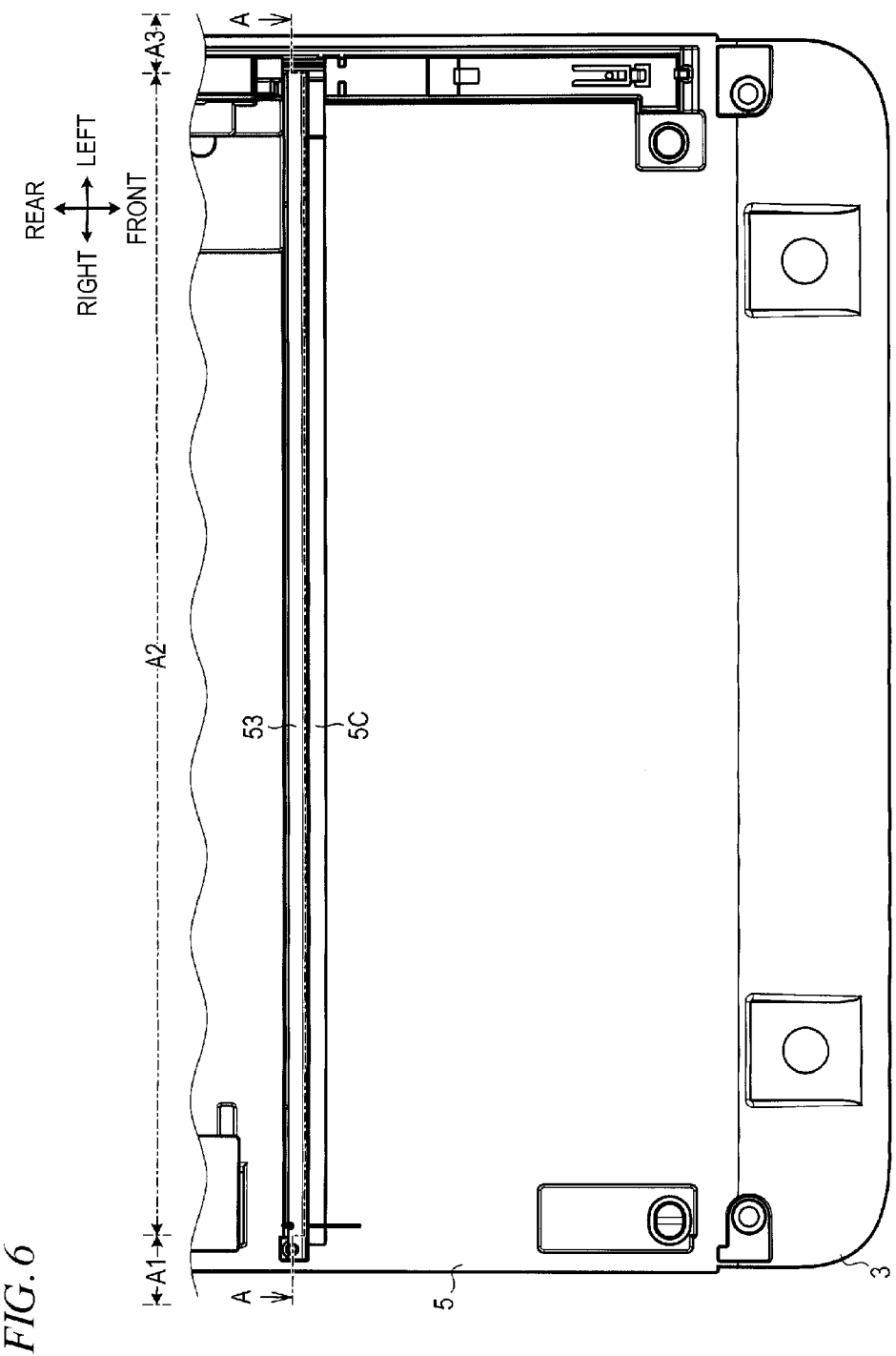
FIG. 6 is a bottom view showing part of the scanner unit.

FIG. 7 is a longitudinal sectional view, as viewed from rear (from back), of a sectional plane taken along a line A-A in FIG. 6. This section along the line A-A is given, in the ranges A1, A3 indicated in FIG. 6, by a sub-section taken nearly centrally of the base portion 53A in the front-rear direction and, in the range A2 indicated in FIG. 6, by a section taken nearly centrally of the ridge portion 53B in the front-rear direction.

The reinforcement member 53 is fixed, at its base portion 53A, on the housing 5 as shown in FIG. 7. More specifically, a left end 53L (right-hand end in FIG. 7) of the reinforcement member 53 is inserted leftward into a cavity 55 formed in the housing 5. A right end 53R (left-hand end in FIG. 7) of the reinforcement member 53 is fixed on the housing 5 by a screw 57 that is screwed from below.

The guide 51 has a plurality of abutting portions 59 that protrude toward a top end of the reinforcement member 53, in respective points (in positions closer to the inner space of the guide 51) confronting the top end of the reinforcement member 53. The abutting portions 59 are formed at five points as shown in FIG. 5.

The guide 51 is in abutment against the top end of the reinforcement member 53 through the abutting portions 59. This forms gaps between the guide member 51 and the top end of the reinforcement member 53, in regions on both sides of the abutting portions 59.

Effects

As described so far, according to the multifunction device 1, the guide 51 made of resin is integrally formed with the housing 5 made of resin. Thus, the guide 51 may be easily formed by resin-forming, as compared to the existing one whose guide is made by a metal shaft in the shape of a round bar.

There is a problem that the resin guide 51 is easy to deform as compared to a metal shaft, which problem is overcome by additionally providing the plate-make reinforcement member 53 to the resin guide 51. This provides the guide 51 with increasing flexural rigidity and suppresses the guide 51 from deforming. Thus, the image sensor 21 and holder 23 may be improved in respect of guiding accuracy. Therefore, by the scanner unit 3, reading of images is to be effected with improved quality.

According to the multifunction device 1, the reinforcement member 53 is received in the space formed by the guide 51. The reinforce member 53 is less obstructive in arranging other members, as compared to the case of additionally providing a reinforcement member 53 outside the guide 51. In addition, height dimension is reduced compared to the case with the provision of a reinforcement member 53 on or under the guide member 51. Thus, the scanner unit 3 may be made smaller in thickness and ultimately the multifunction device 1 may be made entirely smaller in thickness.

In the multifunction device 1, the reinforcement member 53 is fixed on the housing 5 through utilization of the base portion 53A extending parallel with the bottom of the housing 5. This makes it easy to fix the reinforcement member 53 to the housing 5. Particularly, the reinforcement member 53 may be attached completely by merely fixing the reinforcement member 53 only at its right longitudinal end 53R by a screw 57 after insertion of the left longitudinal end 53L of the reinforcement member 53 into the cavity 55. Thus, as compared to the case of fixing the reinforcement member 53 at both longitudinal ends by screwing, the reinforcement member 53 is made easy to attach and may be diminished in the number of screws required for attaching the reinforcement member 53.

In the multifunction device 1, the reinforcement member 53 is configured not to protrude at its base portion 53A from a bottom outer surface of the housing 5. Thus, an operator's or user's finger is prevented from being caught by the base portion 53A during manufacture or maintenance of the multifunction device 1.

According to the multifunction device 1, the guide 51 is in abutment against the top end of the reinforcement member 53 through abutting portions 59. Differently from the structure the guide member 51 at its space-defining side is entirely in abutment against the entire top of the reinforcement member, abutting points are restricted to the places where the abutting portions 59 are present. By providing abutting portions 59 in consideration of points of the guide member 51 where are easy to deform, the guide 51 and the reinforcement member 53 is to be placed in abutment at best suited points and may be suppressed from deforming.

Other Embodiments

Although the embodiment according to the disclosure was described so far, the invention is not limited to the above concrete one embodiment but may be carried out variously in other embodiments.

For example, in the above embodiment, the image reader configured as a multifunction device was exemplified as one example of an image reading apparatus according to the disclosure. However, it is selective whether or not configured as a multifunction device, i.e. the present invention may be applied to a single function of an image reader, photocopier, facsimile machine or the like.

Although in the disclosure the reinforcement member 53 made by a metal plate was added to the resin guide 51, the guide 51 may be improved in rigidity even by use of an equivalent to the reinforcement member as long as the equivalent is made of a material having high mechanical strength even if not made by a metal plate.

For example, it is possible to fabricate an equivalent to the reinforcement member of a resin material, by utilizing a resin material that is different in type from the suitable resin material for integrally forming a housing 5 and a guide 51 and is excellent in post-forming mechanical strength.

According to the above image reading apparatus, the resin guide is integrally formed with the resin housing. Thus, the guide may be easily prepared of a resin, as compared to the existing one whose guide is formed with a metal shaft shaped in a round bar (i.e. circular in cross section perpendicular to an axial direction).

The resin guide problematically tends to easily deform as compared to the metal shaft. In this respect, by adding the resin guide with a reinforcement member made by a metal plate, the resulting guide is given improved flexural rigidity and less deformability. Thus, the image sensor and the holder may be guided with improved accuracy as compared to the case with a resin guide not having such a reinforcement member, with a result that image reading by use of the image reader is improved in quality.

In the image reading apparatus according to the disclosure, the guide is formed by upwardly protruding a bottom inner surface of the housing. The guide is formed therein with a space so that the reinforcement member can be received in the space formed in the guide.

According to the above image reading apparatus, the reinforcement member is received in the space formed in the guide. Thus, the reinforcement member is less obstructive in arranging other members, as compared to the case with an additional reinforcement member provided outside the guide. In addition, height dimension may be decreased to reduce the thickness of the apparatus, as compared to the case with an additional reinforcement member arranged above or below the guide.

According to the above image reading apparatus, the reinforcement member may be fixed to the housing through the base portion extending parallel with the bottom of the housing. This makes it easy to fix the reinforcement member to the housing.

According to the above image reading apparatus, the base portion does not protrude out of the bottom outer surface of the housing. This prevents fingers of an operator or user from being caught by the base portion.

According to the above image reading apparatus, the guide abuts at its abutting portions like the above against a top end of the reinforcement member. Thus, load application is limited to points where the abutting portions exist, differently from the case that the guide wholly abuts against the whole top end of the reinforcement member. Because the abutting portion may be provided taking account of a region of the guide which is easy to deform, the guide is less to deform by being abutted against the reinforcement member at an optimal point.

According to the above image reading apparatus, the reinforcement member may be fixed to the housing without screw-fixing the reinforcement member at its both ends. This makes it easy to attach the reinforcement member and decreasing the number of screws needed to attach the reinforcement member, as compared to the case of screw-fixing the reinforcement member at its both ends.

According to the above image reading apparatus, besides image reading, image forming is possible on a sheet material.

According to the above image reading apparatus, an image of a document may be read by the image reader while feeding the document by utilization of a document feeder.

What is claimed is:

1. An image reading apparatus comprising:
   a document table that comprises one surface on which a document is to be placed;
   an image reader that is disposed over another surface of the document table and is configured to read an image of the document being placed on the document table; and
   a resin housing that houses the document table and the image reader therein;
   wherein the image reader comprises:
      an image sensor including a plurality of reading elements arranged in a first direction;
      a holder configured to support the image sensor;
      a resin guide integrally formed with and disposed at a substantially center portion of the housing;
      a reinforcement member which is made by a metal plate and disposed at the resin guide; and
      a driver configured to move the holder along the resin guide in a second direction substantially perpendicular to the first direction such that the holder contacts the resin guide but does not contact the reinforcement member,
   wherein the reinforcement member comprises a plate-shaped based portion extending parallel with a bottom of the housing and a plate-shaped ridge portion extending substantially perpendicular to the bottom of the housing, and the reinforcement member is fixed to the housing through the base portion.

2. The image reading apparatus according to claim 1, wherein
the housing comprises a bottom inner surface which protrudes upwardly to form the resin guide so that a space is formed at an inside of the resin guide, and
the reinforcement member is received in the space of the resin guide.

3. The image reading apparatus according to claim 1, wherein
the housing is formed with a recess in a bottom outer surface of the housing, and
the base portion is received in the recess and arranged in a position not protruding downward from the bottom outer surface of the housing.

4. The image reading apparatus according to claim 1, wherein
the resin guide comprises an abutting portion configured to be abutted against a top end of the reinforcement member, and
a gap is formed between the resin guide and the reinforcement member at a region other than the abutting portion.

5. The image reading apparatus according to claim 1, wherein
the reinforcement member comprises one longitudinal end that is fixed to the housing by being inserted into a cavity formed in the housing and another longitudinal end fixed to the housing by a screw.

6. The image reading apparatus according to claim 1, wherein
the housing forms an upper casing, and
the upper casing is arranged on a lower casing having an image forming section.

7. The image reading apparatus according to claim 1 further comprising:
a cover that is configured to be opened and closed relative to the housing such that, when the cover is closed, the document table is covered and, when the cover is opened, the document table is exposed; and
a conveyor that is provided at the cover and is configured to convey a document along a conveyance path,
wherein the conveyor is configured to convey a document on a way of the conveyance path while a part of the document contacts a part of the one surface of the document table, and
wherein the image reader is positioned to be opposed to the part of the one surface of the document table and configured to read an image of the document from a position opposite to the document when the document is conveyed by the conveyor.

8. The image reading apparatus according to claim 1, wherein, when viewed in a vertical direction, the resin guide and the reinforcement member overlap one another.

* * * * *